Feb. 15, 1966     H. R. ROSCOE     3,234,579
WINDSHIELD WASHER
Filed May 25, 1964
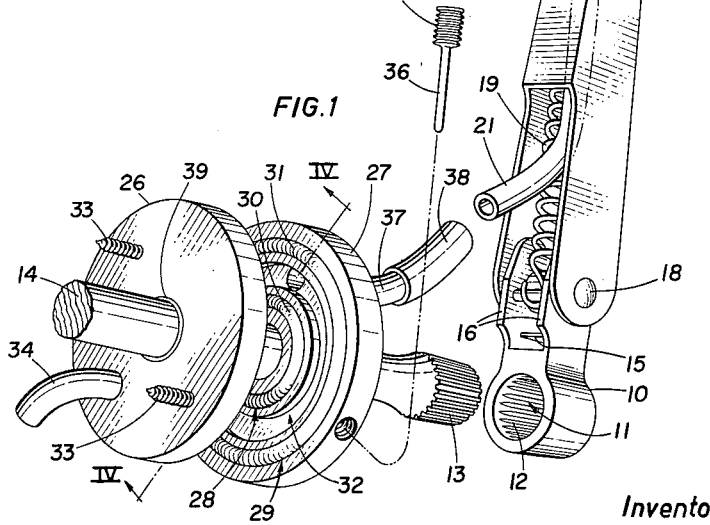
*Inventor*
HAROLD RUSSELL ROSCOE
by: *Cavanagh & Norman*

United States Patent Office 3,234,579
Patented Feb. 15, 1966

3,234,579
WINDSHIELD WASHER
Harold Russell Roscoe, 29 Fairview Ave.,
Hamilton, Ontario, Canada
Filed May 25, 1964, Ser. No. 369,700
2 Claims. (Cl. 15—250.04)

The invention relates to windshield washers of the type which are incorporated in the arms of the windshield wiper assembly of an automobile.

The shortcomings of conventional automobile windshield washers of the type which comprise jets fastened adjacent to the lower edge of the windshield are well known to everyone. Such jets are seldom, if ever, correctly adjusted and frequently spray the washer fluid in the wrong direction and are subject to failure of operation at high speeds or in conditions of severe cross winds. In addition, they usually fail to provide an even spread of fluid over the windshield with a result that only a poor and inefficient cleaning action is achieved.

The advantages of mounting the washer jets on the arms of the windshield wiper assembly are obvious. Thus, the problem of aiming the jets in a particular way is overcome since the jets will be located only a very short distance from the surface of the windshield. The self same factor also overcomes the problem of inefficient operation at high speeds and in cross winds, and also achieves an even distribution of fluid over the entire surface of the windshield. However, such devices of this latter type as have been proposed heretofore have been both relatively unsightly, commonly involving the attachment of fluid tubes along the inner surface of the windshield wiper arm which is thus exposed to view from the interior of the automobile, and in addition, have frequently been relatively expensive and hence having only a limited appeal.

Accordingly it is an objective of the present invention to provide a windshield washer device incorporated in the windshield wiper arm which is unobtrusive and substantially concealed from view from the interior and the exterior of the automobile and is also both relatively inexpensive and is efficient and reliable in use.

More particularly, it is an objective of the present invention to provide a windshield washer assembly having the foregoing advantages wherein the tube carrying the windshield washer fluid along the windshield wiper arm, in itself, constitutes the windshield wiper arm.

More particularly, it is an object of the present invention to provide a windshield washer device having the foregoing advantages which is provided with improved fluid coupling means.

A preferred embodiment of the invention will now be described by way of example only with reference to the following drawings in which like reference devices refer to like parts thereof throughout the various views and diagrams and in which:

FIGURE 1 is an exploded perspective view with a part thereof shown in phantom form, FIGURE 2 is a section along the line II—II of FIGURE 1.

FIGURE 3 is a section along the line III—III of FIGURE 1,

FIGURE 4 is a partial section along the line IV—IV of FIGURE 1, and,

FIGURE 5 is a section of an alternative embodiment.

From FIGURE 1 it will be noted that this preferred embodiment of the invention comprises a conventional windshield wiper arm hub 10 having a socket 11 provided with internal splines 12 adapted to receive in mating engagement with the splined end 13 of a windshield wiper drive shaft 14, spring clip 15 is provided in hub 10, of conventional construction, for retaining hub 10 in engagement with drive shaft 14. Brackets 16 extend from hub 10 and the box shaped housing 17 is attached thereto by pin 18 which is spring biased towards the windshield (not shown) by means of spring 19.

According to this preferred embodiment of the invention, tube 20 is fastened in housing 17 and has a lower end 21 bent at an angle thereto and extending therefrom towards the direction of drive shaft 14. The free end of tube 20 carries the conventional bayonet 22 rotatably fastened to plate 23 by means of screw 24 permitting adjustment thereof for attachment thereto of the windshield wiper blade assembly (not shown) in conventional manner. Two washer fluid jet orifices 25 are provided at the free end of tube 20 directed at an angle of about 90° to one another, although obviously, more or less such orifices may be provided in any particular case. It will be noted from FIGURES 2 and 3 that the cross-section of tube 20 differs along its length, in order to ensure stability of the assembly during wiping action. In order to carry the washer fluid to lower end 21 to tube 20, the fluid distribution device is provided which comprises a fixed plate 26 and a rotating plate 27. Each of plates 26 and 27 are provided with three concentric annular grooves. Inner groove 28 and outer groove 29 are provided for the purpose of carrying rubber O-rings 30 and 31 respectively. Intermediate groove 32 is provided for the purpose of forming an annular fluid distribution channel. Fixed plate 26 is fastened to the body work of the automobile adjacent to drive shaft 14 by means of screws 33 and is connected to a suitable supply of washer fluid by means of hose connection 34. Moveable plate 27 is fastened in a predetermined orientation to drive shaft 14 by means of set-screw 35 having a pin 36 extending therefrom to make contact with the surface of the shaft 14, to ensure that plate 27 rotates in unison with shaft 14 at all times. Junction pipe 37 extends from plate 27 and is joined to lower end 21 of tube 20 by means of hose 38. Plastic bushing 39 may be employed in fixed plate 26 to permit extended periods of rotation of shaft 14 therein without wear.

An alternative form of locating jet orifices 25 is shown in FIGURE 5 wherein it will be noted that tube 20 is indented as at 40, 40 to provide angled surfaces 41, 41 and four orifices 25 are formed in such surfaces thus directing washer fluid both upwardly and downwardly on the automobile windshield, on either side of the wiper blade (not shown).

In operation, when the windshield wipers are switched on and shaft 14 is rotating to and fro, plate 27 will rotate through a predetermined arc relative to plate 26 which will remain stationary, being fastened to the body of the car. Windshield washer fluid, in response to pumping action from the windshield washer pump system (not shown) will pass through junction 34 and into and around annular distribution groove 32 and thence into junction 37 and up tube 20 and will escape therefrom onto the windshield of the automobile through orifices 25 which in this preferred embodiment, will direct two streams of fluid one on either side of the windshield wiper blade (not shown) to achieve the maximum efficiency in the washing operation.

It will be noted that tube 20, being in fact part of the wiper arm assembly will be in effect, concealed from view from any part of the automobile, by virtue of being disguised as the windshield wiper arm itself. In addition, the distribution of wiper fluid from the body of the car to the wiper arm is achieved by means of the distribution system described above which substantially eliminates the need for lengthy portions of flexible hose extending between the body of the automobile and the windshield wiper arm which, in prior devices, have produced an unsightly result, which also was subject to random failures due to constant wear during use of the windshield wipers.

The foregoing description of a preferred embodiment of the invention is here made by way of example only. The invention is not to be taken as limited to any of the specific features described but comprehends all such variations thereof as come within the spirit and scope of the appended claims.

What I claim is:

1. A windshield washer device for use in association with a windshield wiper shaft of an automobile and comprising a hub portion; an arm portion hingedly attached to said hub portion; liquid conduit means incorporated in and extending up said arm portion; means at the free end of said arm portion for attachment of a wiper blade; fluid outlets adjacent said attachment means; fixed plate means attachable to the body of an automobile and having an enlarged opening therein for assembly over a wiper drive shaft; bearing means fitting within said opening and around said drive shaft; conduit means on said fixed plate for connection to a fluid reservoir; rotatable plate means adjustably attachable to said drive shaft; threaded means releasably engaging said rotatable plate and said drive shaft for securing same in predetermined location and in sealing engagement with said fixed plate; sealing means between said plates and conduit means connected between said arm portion and said rotatable plate.

2. A windshield washer device for use in association with the windshield wiper shaft of an automobile and comprising; a hub portion attachable to said wiper shaft; an arm portion hingedly attached to said hub portion by one end thereof; spring means biasing said arm portion into a predetermined orientation relative to said hub portion; a fluid tight tube forming part of said arm portion; two fluid distribution plate members; attachment means for a first said plate for rigid attachment to a portion of an automobile body; attachment means for the other said plate for adjustable attachment thereof on said wiper shaft in sealing engagement with said first plate; means attached to said first plate for introducing washer fluid between plates, sealing means preventing escape of fluid between said plates; conduit means extending from said other plate and communicating between the interior of said plates and said tube and fluid outlets in said tube portion adjacent the free end of said arm and remote from said hub portion.

References Cited by the Examiner

UNITED STATES PATENTS

| | | | |
|---|---|---|---|
| 2,148,901 | 2/1939 | De Valle | 285—134 X |
| 2,168,202 | 8/1939 | Grantham | 15—250.04 |
| 2,392,670 | 1/1946 | Horton | 15—250.35 |
| 2,662,785 | 12/1953 | Farwick | 285—9 |
| 2,856,901 | 10/1958 | Kvarnstrom et al. | 12—250.04 |

CHARLES A. WILLMUTH, *Primary Examiner.*